(12) United States Patent
Kato et al.

(10) Patent No.: US 11,438,522 B2
(45) Date of Patent: Sep. 6, 2022

(54) IMAGE PICKUP APPARATUS AND IMAGE PICKUP METHOD

(71) Applicant: JVCKENWOOD Corporation, Yokohama (JP)

(72) Inventors: Hidehiro Kato, Yokohama (JP); Takahiro Furukawa, Yokohama (JP); Yuzuru Kanazawa, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/526,844

(22) Filed: Nov. 15, 2021

(65) Prior Publication Data

US 2022/0191372 A1 Jun. 16, 2022

(30) Foreign Application Priority Data

Dec. 15, 2020 (JP) .............................. JP2020-207543

(51) Int. Cl.
*H04N 5/238* (2006.01)
*G02B 15/00* (2006.01)
*G02B 7/04* (2021.01)

(52) U.S. Cl.
CPC .............. *H04N 5/238* (2013.01); *G02B 7/04* (2013.01); *G02B 15/00* (2013.01)

(58) Field of Classification Search
CPC ..... H04N 5/228; H04N 5/23248–2329; G03B 2217/005; G03B 2207/005; G03B 2205/0007–0038
USPC ....... 348/208.3, 208.11, 208.7, 208.5, 208.4, 348/208.2; 396/52–55; 359/554–557
See application file for complete search history.

(56) References Cited

U.S. PATENT DOCUMENTS

2011/0273572 A1* 11/2011 Tsuchida ............ H04N 5/23287
348/208.4

FOREIGN PATENT DOCUMENTS

JP 2001228500 A 8/2001

* cited by examiner

*Primary Examiner* — Xi Wang
(74) *Attorney, Agent, or Firm* — Procopio, Cory, Hargreaves & Savitch LLP (57) ABSTRACT

Provided is an image pickup apparatus that can determine a step-out with a high approximation accuracy and then return a lens position to an initial position. The image pickup apparatus includes: an optical element that is movable with respect to a predetermined initial position; acceleration detection means that detects a shock applied to a body of the apparatus and outputs a vector of the shock; and control means that adds up an optical axis direction component of the optical element in the vector of the shock each time the shock is detected and, when a cumulative shock that is a result of adding up exceeds a predetermined threshold, determines that the optical element has stepped out and returns the optical element to the initial position.

7 Claims, 12 Drawing Sheets

IMAGE PICKUP APPARATUS AND IMAGE PICKUP METHOD

CROSS REFERENCE TO RELATED APPLICATION

This application is based upon and claims the benefit of priority from Japanese patent application No. 2020-207543, filed on Dec. 15, 2020, the disclosure of which is incorporated herein in its entirety by reference.

BACKGROUND

The present disclosure relates to an image pickup apparatus and an image pickup method.

An image pickup apparatus using a zoom lens and the like changes a lens position by making a screw shaft and a rack engaged and thereby rotating the shaft.

In such an image pickup apparatus, the positions of a zoom lens and a focus lens sometimes deviate from a cam locus due to the disengagement or the like of the screw shaft and the rack which is induced by vibration such as a shock or the like applied to a body of the apparatus. Then, even though the focus lens has moved to a focusing position in the body of the apparatus, a blurred picture is obtained in actuality.

To solve such a problem, Japanese Unexamined Patent Application Publication No. 2001-228500 (patent literature 1) discloses an image pickup apparatus that detects vibration such as a shock or the like applied to a body of the apparatus by an acceleration sensor and when this vibration exceeds a predetermined level, returns an optical element to an initial position.

SUMMARY

According to a technique disclosed by the patent literature 1, whether a step-out has occurred is determined by approximating a step-out to a shock detected by the acceleration sensor. More specifically, the necessity to return a lens position to an initial position (reset operation) is determined not from a step-out itself but from a detection value of the acceleration sensor.

However, the determination in the patent literature 1 has the problem of poor accuracy in this approximation.

For example, when a threshold value is small, a malfunction, in which a lens position reset operation is performed even when a step-out has not occurred, frequently occurs. Furthermore, when a threshold value is great, a lens position reset operation is not performed even when a step-out occurs, which adversely affects shooting.

An image pickup apparatus of an embodiment includes: an optical element that is movable with respect to a predetermined initial position; acceleration detection means that detects a shock applied to a body of the apparatus and outputs a vector of the shock; and control means that adds up an optical axis direction component of the optical element in the vector of the shock each time the shock is detected and, when a cumulative shock that is a result of adding up exceeds a predetermined threshold value, determines that the optical element has stepped out and returns the optical element to the initial position.

An image pickup method of an embodiment includes: detecting a shock applied to a body of the apparatus; adding up a vector of the shock in an optical axis direction of an optical element included in the apparatus each time the shock is detected; and, when a cumulative shock that is a result of adding up exceeds a predetermined threshold value, determining that the optical element has stepped out and returning the optical element to a predetermined initial position.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Figure 1:
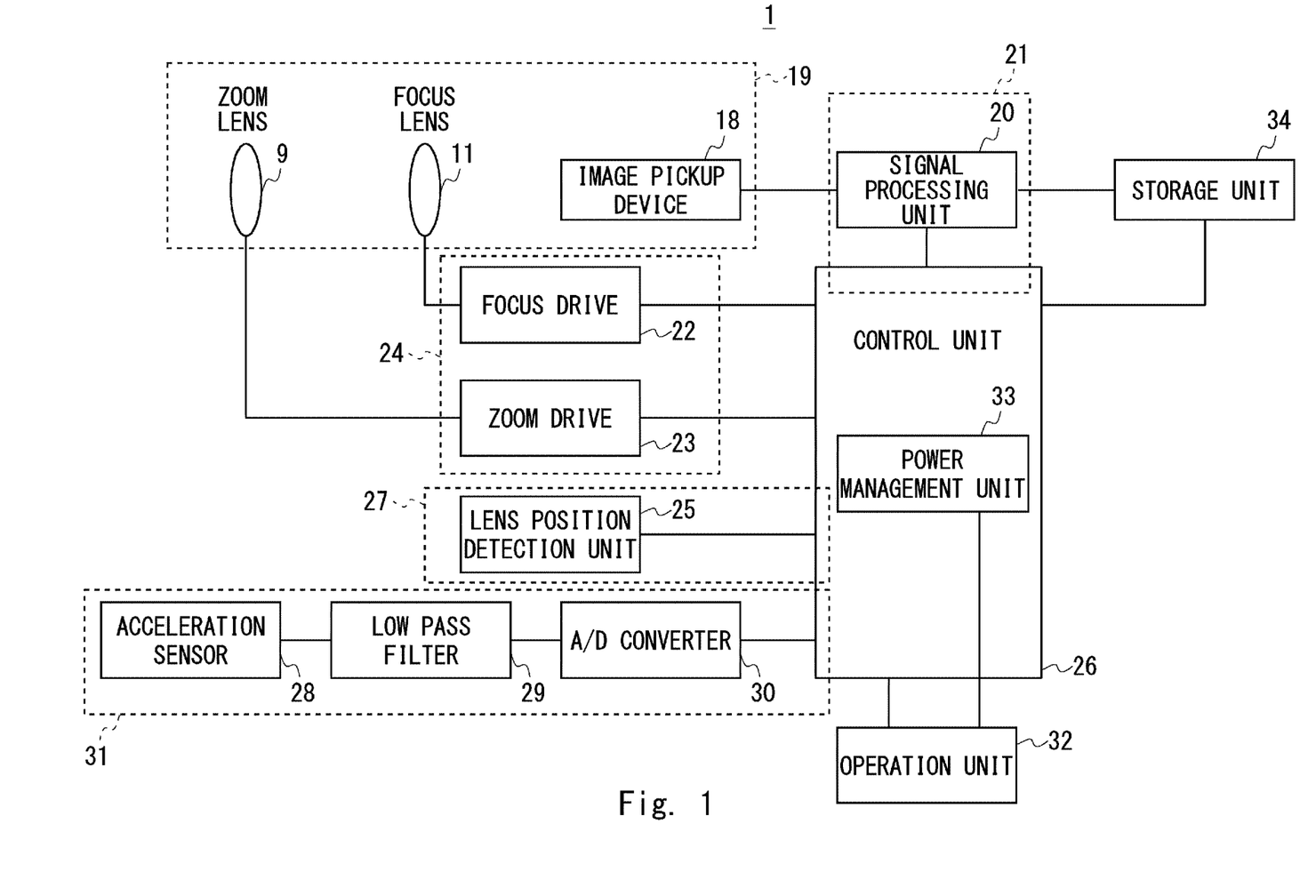
FIG. 1 is a diagram illustrating a schematic configuration of an image pickup apparatus according to a first embodiment.

Hereinafter, an embodiment of the present disclosure will be described with reference to drawings. FIG. 1 is a diagram illustrating a schematic configuration of an image pickup apparatus according to a first embodiment. In FIG. 1, an image pickup apparatus 1 includes: a zoom lens 9, a focus lens 11, an image sensor 18, a signal processing unit 20, a focus drive 22, a zoom drive 23, a lens position detection unit 25, a control unit 26, an acceleration sensor 28, a low pass filter 29, an A/D converter 30, an operation unit 32, a power management unit 33, and a storage unit 34.

In addition, an image pickup unit 19 includes the zoom lens 9, the focus lens 11, and the image sensor 18. The image pickup unit 19 captures an image of an object as picture information.

A contrast calculation unit 21 includes the signal processing unit 20 and the control unit 26. The signal processing unit 20 performs picture signal processing and image compression processing, and also performs recording to the storage unit 34 simultaneously.

The contrast calculation unit 21 calculates a contrast value from a picture signal from the image pickup unit 19.

A lens driving unit 24 includes the focus drive 22 and the zoom drive 23. The focus drive 22 drives the focus lens 11.

The zoom drive 23 drives the zoom lens 9. Driving of the zoom lens 9 and the focus lens 11 is performed by control of the control unit 26.

A lens position control unit 27 includes the lens position detection unit 25 and the control unit 26. The lens position control unit 27 detects a home position in initialization by using, for example, a photo transistor and controls a lens position.

A shock detection unit 31 includes the acceleration sensor 28, the low pass filter 29, the A/D converter 30, and the control unit 26. The control unit 26 further includes the power management unit 33. The shock detection unit 31 outputs acceleration information according to a shock applied to a body of the image pickup apparatus 1. It should be noted that, preferably, the shock detection unit 31 is energized even in a standby state so as to detect a shock. Since a shock is detected as an acceleration, the shock detection unit 31 may also be referred to as acceleration detection means (acceleration detection unit).

The acceleration sensor 28 is a three-axis acceleration sensor. The acceleration sensor 28 detects a shock applied to the body of the image pickup apparatus 1 and outputs an analog acceleration signal. Then, the low pass filter 29 removes a high frequency component from the acceleration signal, and furthermore, the A/D converter 30 digitizes the signal and outputs it as acceleration information. After those processes, the acceleration information is notified to the control unit 26. The acceleration information includes not only the magnitude of the acceleration but also information on the direction thereof. Therefore, the acceleration information is preferable to be vector information.

The storage unit 34 is an internal memory that stores a picture picked up by the image pickup apparatus 1 and various information such as a program and data required for the operation of the control unit 26.

The operation unit 32 is an interface that accepts an input from a user. The operation unit 32, which is composed of, for example, a power switch, a recording start switch, a menu switch, and a touch panel, constitutes a user interface.

The power management unit 33 is a part of the control unit 26. The power management unit 33 stops power supply to other than the power management unit 33 and the shock detection unit 31 when in a standby state for power saving.

In addition, the power management unit 33 monitors a press and release of the power switch of the operation unit 32 and when the power switch is operated, turns the power on and off for the entire image pickup apparatus 1.

The control unit 26 performs: control of the signal processing unit 20 in the contrast calculation unit 21; control of a lens position of the focus lens 11 in the lens position control unit 27; acquisition of acceleration information in the shock detection unit 31; control of the operation unit 32, and the like. In addition, the control unit 26 determines whether it is necessary to initialize the lens position of the focus lens 11, based on the acceleration information. When determining that it is necessary to initialize the lens position of the focus lens 11, the control unit 26 controls the lens driving unit 24 in the lens position control unit 27 to perform a reset operation of the lens position of the focus lens 11. The function of the control unit 26 is implemented by, for example, a processor such as a CPU (central processing unit) executing a program stored in the storage unit 34.

The following is an example of the determination in the control unit 26.

First, if the magnitude of an optical axis direction component in the acceleration information detected by the shock detection unit 31 exceeds a predetermined first threshold value $\alpha$ (which corresponds to the first threshold value smaller than the predetermined threshold value in the appended claims), the control unit 26 determines that it is necessary to initialize the lens position of the focus lens 11 and performs a reset operation of the lens position. In the following description, unless otherwise specified, the lens position refers to the position of the focus lens 11 and the reset operation of the lens position is simply expressed as the reset operation.

In addition, the control unit 26 stores in the storage unit 34 values of records of shocks when the magnitude of the optical axis direction component in the acceleration information is the first threshold value $\alpha$ or smaller. Then, the control unit 26 calculates a vector sum [G] of signed shock records in the optical axis direction. More specifically, the control unit 26 adds up optical axis direction components each having a magnitude with respect to a mounting position of the acceleration sensor being the first threshold value a or smaller in the acceleration information, thereby calculating the vector sum [G] of signed shock records in the optical axis direction. In the following description, the magnitude of an optical axis direction component in the acceleration information is simply expressed as the magnitude of a shock for easy understanding.

If the vector sum [G] exceeds a second threshold value $\beta$ (which corresponds to the predetermined threshold value in the appended claims), the control unit 26 determines that the reset operation is necessary, and performs the reset operation. The second threshold value $\beta$ may be changed according to a zoom position.

The above determination operation will be described in detail with reference to drawings. FIG. 2 to FIG. 6 are examples of a graph illustrating a relationship between a shock and a step-out amount. In FIG. 2 to FIG. 6, a horizontal axis indicates the magnitude of a shock [G]. A vertical axis indicates a step-out amount [pulse].

Figure 2:
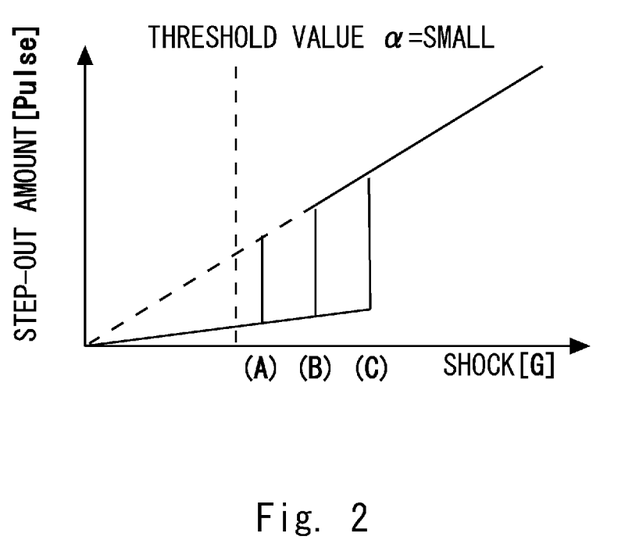
FIG. 2 is an example of a graph illustrating a relationship between a shock and a step-out amount.

A step-out may occur at the magnitude of a shock (A), (B), or (C) according to a mechanical variation or the timing of a shock even on the same mechanism. In general, to perform detection reliably, it is preferable to set the first threshold value $\alpha$ to be smaller than all of the shocks (A), (B), and (C). FIG. 2 is an example of setting the first threshold value a to be smaller than all of the shocks (A), (B), and (C) (threshold value $\alpha$=small).

Figure 3:
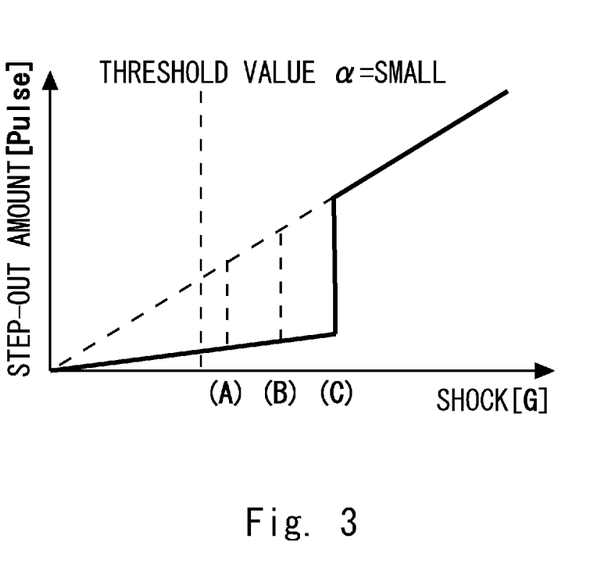
FIG. 3 is an example of a graph illustrating a relationship between a shock and a step-out amount.

However, in some cases, the image pickup apparatus causes a step-out at the shock (C) or greater and does not cause a step-out at the shocks (A) and (B), as indicated by a bold line in FIG. 3. Therefore, when the threshold value $\alpha$=small, the reset operation frequently occurs even though a step-out does not occur.

Figure 4:
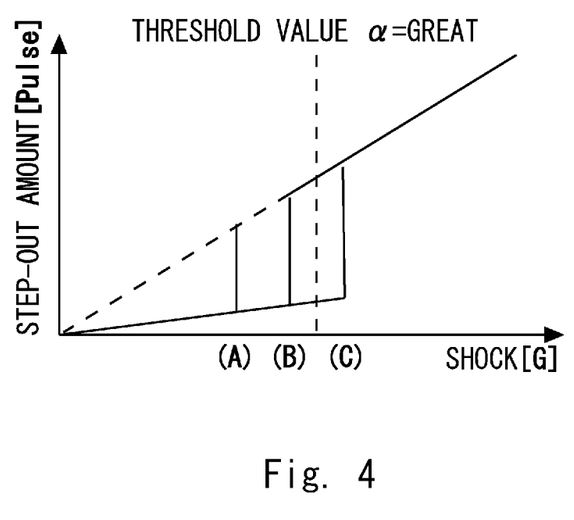
FIG. 4 is an example of a graph illustrating a relationship between a shock and a step-out amount.

Detection only at the shock (C) is allowed by setting the first threshold value $\alpha$ to be greater than the shocks (A) and (B) and smaller than the shock (C). FIG. 4 is an example of setting the first threshold value a to be greater than the shocks (A) and (B) and smaller than the shock (C).

Figure 5:
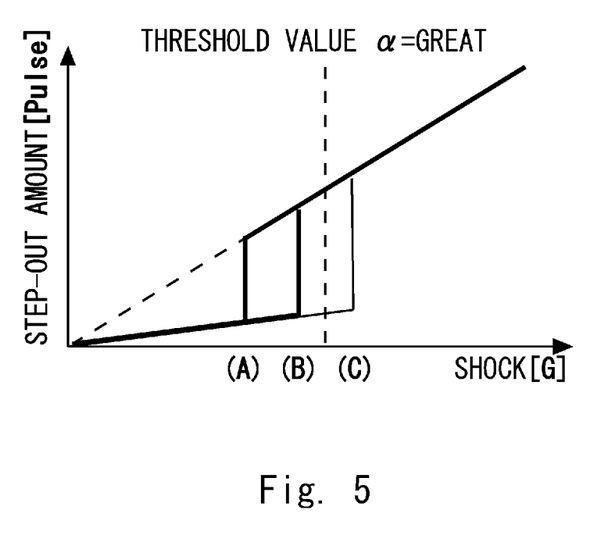
FIG. 5 is an example of a graph illustrating a relationship between a shock and a step-out amount.

However, in some cases, a step-out occurs at the shocks (A) and (B), as indicated by a bold line in FIG. 5, where detection is impossible. Assume that the first shock is (A) and the second shock is (B). Since both of them do not exceed the first threshold value $\alpha$, the reset operation is not performed.

However, there is possible a case where the step-out amount is not necessarily zero and not a little step-out has occurred. For example, for a step-out by one thread turn of a screw shaft, the reset operation may be unnecessary. However, accumulation of such a small step-out may eventually cause the reset operation to be needed.

Therefore, as illustrated in FIG. 5, step-outs occur even though it is not determined in individual determinations of the shocks (A) and (B) that those step-outs need the reset operation. As a result, although the position of the focus lens 11 needs initialization, the initialization is not performed.

The image pickup apparatus of the first embodiment determines, when a shock smaller than the first threshold value α exists for a plurality of times, that a step-out has occurred, and causes the reset operation.

Figure 6:
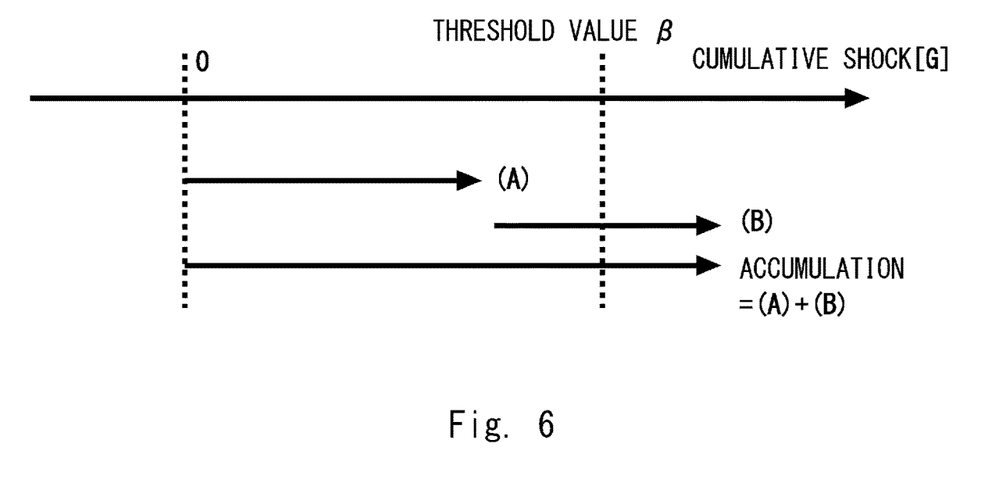
FIG. 6 is a graph illustrating an example of determination based on an accumulation of shocks.
Figure 7:
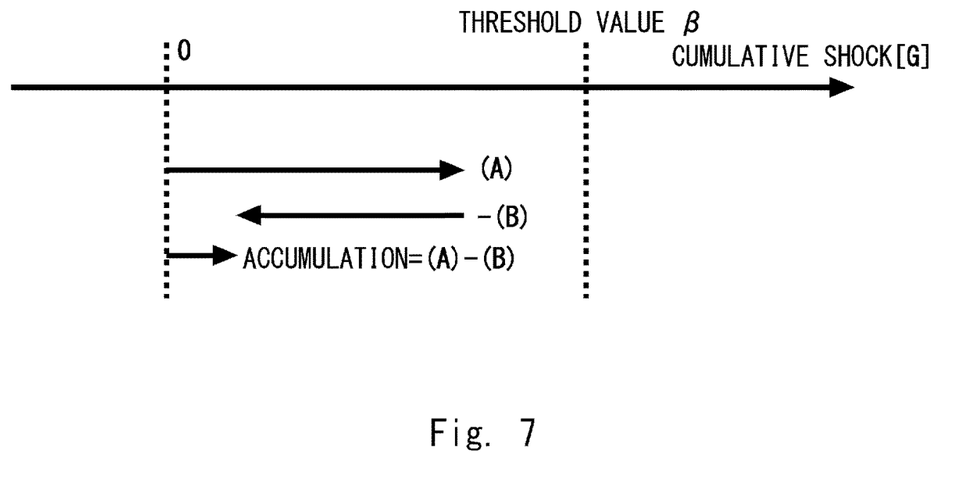
FIG. 7 is a graph illustrating an example of determination based on an accumulation of shocks.
Figure 8:
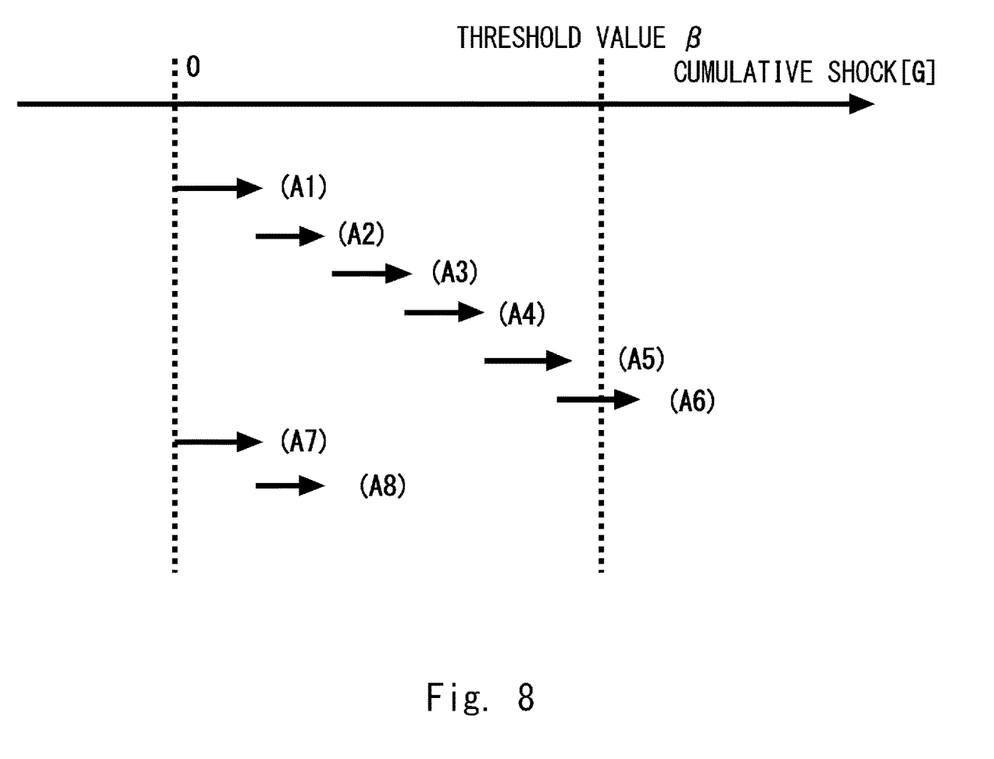
FIG. 8 is a graph illustrating an example of determination based on an accumulation of shocks.

FIG. 6 to FIG. 8 are graphs illustrating examples of determination based on the accumulation of shocks. In FIG. 6 to FIG. 8, a horizontal axis indicates a cumulative shock [G] (vector sum [G] of shock records). A vertical axis indicates the elapse of time.

FIG. 6 is an example of first receiving a shock (A) and then receiving a shock (B). The control unit 26 adds two shocks as vectors in an optical axis direction. FIG. 6 is an example in which the shock (A) and the shock (B) are shocks in the same direction on the optical axis. Then, whether the cumulative shock [G] ((A)+(B)) that is an addition of two shocks exceeds the second threshold value β is determined. If the cumulative shock [G] exceeds the second threshold value β, the reset operation is performed.

FIG. 7 is an example in which the shock (A) and the shock (B) are shocks in directions opposite to each other on the optical axis. In FIG. 7, when the shock (B) is in a direction opposite to that of the shock (A), the shock (B) is subtracted from the shock (A). A cumulative shock [G] that is a result of this subtraction does not exceed the second threshold value β. In other words, it is considered that the shock in the opposite direction reduces the step-out amount.

A shock amount may be added up three or more times. FIG. 8 is an example of adding up more shocks. The shock amount is added up in order of a shock (A1), a shock (A2), a shock (A3), . . . after the previous reset operation. In the example of FIG. 8, the cumulative shock [G] exceeds the second threshold value β at the time of the sixth shock (A6) and therefore, the reset operation is performed. In this manner, the adding up continues until the reset operation is performed.

The control unit 26 resets, after the reset operation is performed, the cumulative shock [G] to zero. After that, it adds up the shock amount in order of a shock (A7), a shock (A8), . . . in a similar manner. In addition, the control unit 26 resets the cumulative shock [G] to zero also when the body of the image pickup apparatus 1 is powered on or off and when the lens position of the zoom lens 9 changes, so as to be able to start adding up again.

Figure 9:
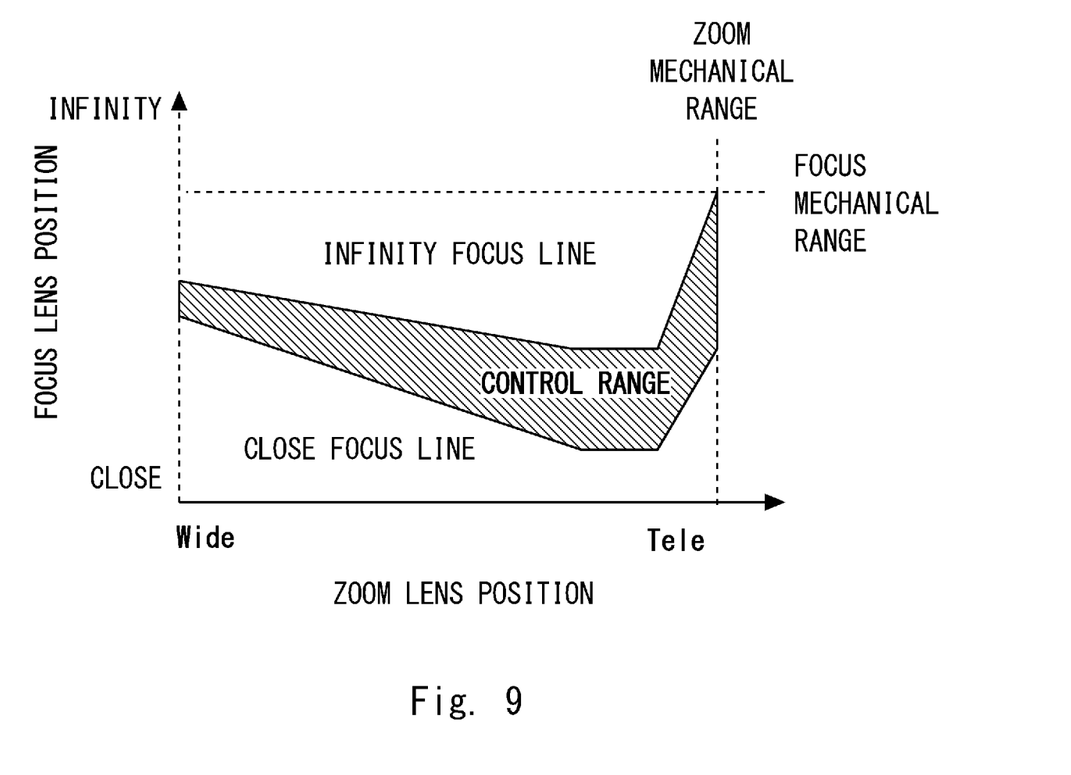
FIG. 9 is a graph illustrating a control range for focus on an object and a movable range of a mechanism with respect to positions of a focus lens and a zoom lens.

Next, setting of the second threshold value β will be described. FIG. 9 is a graph illustrating a control range for focus on an object and a range in which each lens can be moved by the lens driving unit 24, with respect to positions of the focus lens 11 and the zoom lens 9. In FIG. 9, a horizontal axis indicates the position of the zoom lens 9 and a vertical axis indicates the position of the focus lens 11. A focus mechanical range refers to a range in which the focus drive 22 can drive the focus lens 11 and a zoom mechanical range refers to a range in which the zoom drive 23 can drive the zoom lens 9. In the following description, the focus drive 22 and the zoom drive 23 may be collectively referred to as a mechanism.

A relationship among the positions of the focus lens 11 and the zoom lens 9, the control range for focus on an object, and the movable range of the mechanism for the focus lens 11 and the zoom lens 9 is illustrated by the curved lines and range in FIG. 9.

Figure 10:
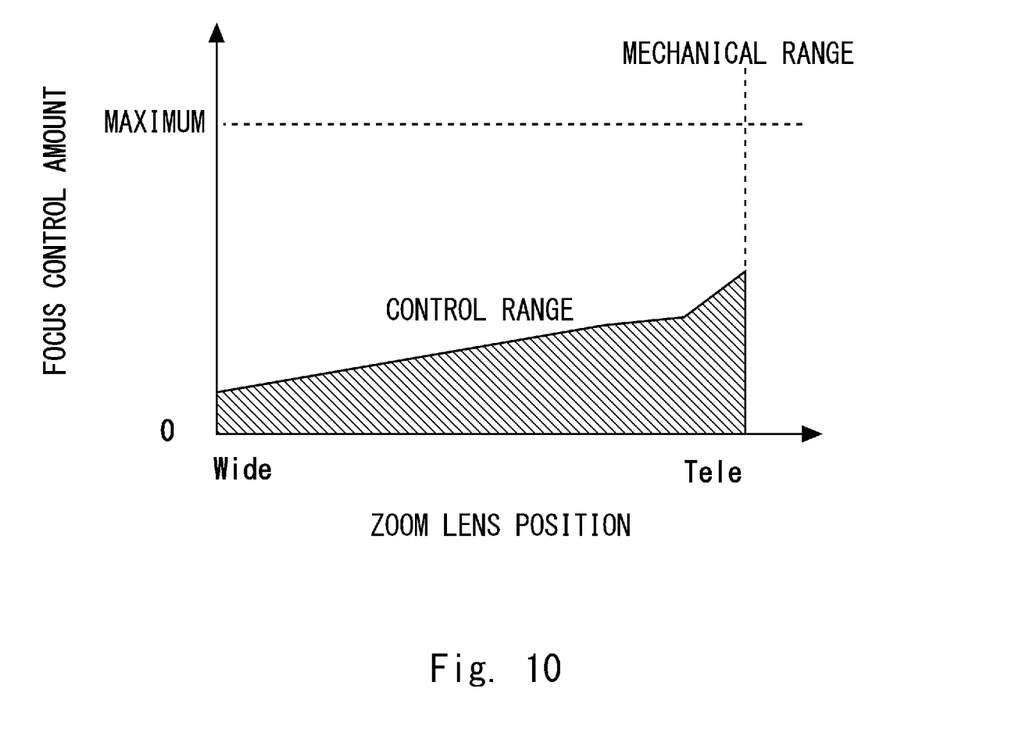
FIG. 10 is a graph illustrating a relationship between a position of a zoom lens and a focus control amount.

Here, when the control range for focus on an object in a positional direction of the focus lens 11 at a position of the zoom lens 9 is defined as a focus control amount, a relationship between the position of the zoom lens 9 and the focus control amount is illustrated by FIG. 10. FIG. 10 is a graph illustrating the relationship between the position of the zoom lens 9 and the focus control amount. In FIG. 10, a horizontal axis indicates the position of the zoom lens 9. A vertical axis indicates the focus control amount. A mechanical range refers to a range in which the focus drive 22 and the zoom drive 23 can move their respective lenses.

As shown in FIG. 10, a focus control range is smaller on the Wide side than on the Tele side. In other words, the focus control amount, even if it is the same, has more influence on focusing on the Wide side. Therefore, the second threshold value β described above may be changed according to the position of the zoom lens 9 (zoom position).

Figure 11:
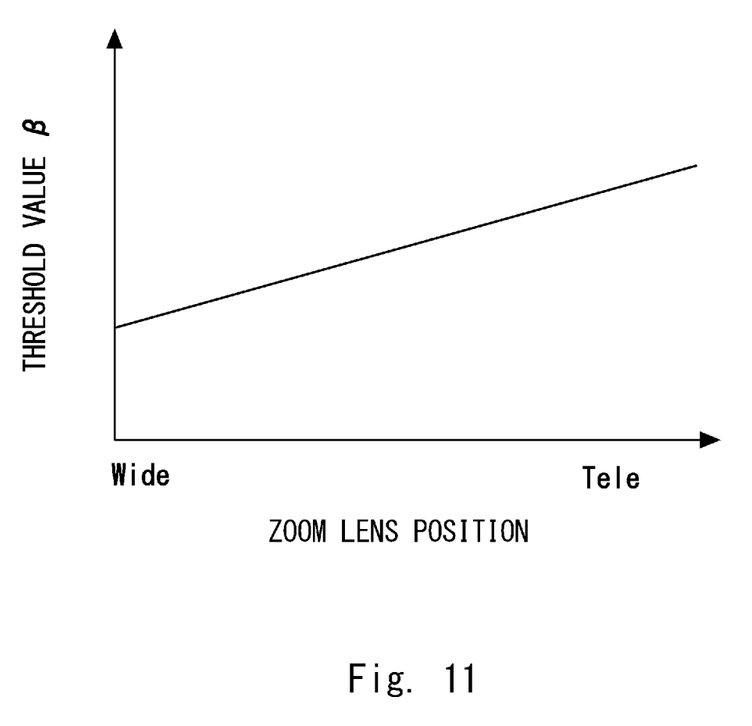
FIG. 11 is a graph illustrating a relationship between a threshold value $\beta$ and a position of a zoom lens.

Alternatively, instead of obtaining the threshold value β from the focus control amount described above, a curved line of the threshold value β may be collinearly approximated. In short, the threshold value β may be changed according to a zoom position. FIG. 11 is a graph illustrating a relationship between the threshold value β and the position of the zoom lens 9. In FIG. 11, a horizontal axis indicates the position of the zoom lens 9. A vertical axis indicates the threshold value β. In an example of FIG. 11, the threshold value β is set according to the zoom position by using collinear approximation.

Figure 12:
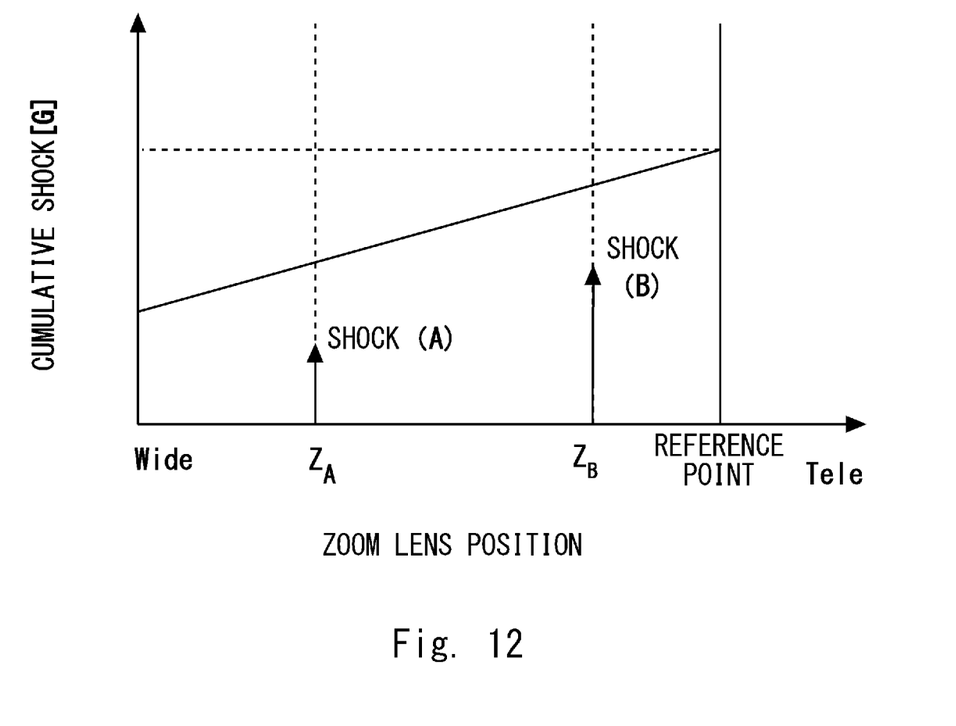
FIG. 12 is a graph illustrating a relationship between a threshold value $\beta$ and a cumulative shock.

In addition, with respect to the zoom position at a Tele end, a shock value may be converted into a conversion value in accordance with the ratio of the threshold value β at each zoom position to the threshold value β at the Tele end. FIG. 12 is a graph illustrating a relationship between the threshold value β and a cumulative shock with the zoom position at the Tele end set as a reference point. Furthermore, the above processing may be performed by referring to a relational table, which is predetermined assuming that a step-out has occurred, for a shock value and each estimated zoom position.

As described above, the image pickup apparatus of the first embodiment makes it possible to determine a step-out with a high approximation accuracy by adding up a vector of a shock applied to the body of the apparatus in consideration of a force direction and performing comparison with the second threshold value β even when the shock applied to the body of the apparatus is smaller than the first threshold value α.

The present disclosure is not limited to the above embodiment and may be appropriately modified without departing from the spirit thereof. For example, the components illustrated in the drawings as functional blocks for performing various processes can be provided in a form of hardware including a CPU, a memory, and other circuits, and can be implemented in a form of software, for example, a program loaded in the memory. Thus, it is understood by those skilled in the art that these functional blocks can be realized in a variety of forms such as by hardware only, software only or the combination thereof and they are not limited to any of these.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

As described above, the image pickup apparatus and image pickup method of the present embodiment make it possible to determine a step-out of a lens with a high approximation accuracy and then return the position of the lens to its initial position.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An image pickup apparatus comprising:
   an optical element configured to be movable with respect to a predetermined initial position;
   an acceleration detection unit configured to detect a shock applied to a body of the apparatus and outputting a vector of the shock; and
   a control unit configured to perform:
      adding up an optical axis direction component of the optical element in the vector of the shock each time the shock is detected; and
      when a cumulative shock exceeds a predetermined threshold value, the cumulative shock being a result of the adding up, determining that the optical element has stepped out and returning the optical element to the initial position.

2. The image pickup apparatus according to claim 1, wherein
   the control unit adds up the optical axis direction component when a magnitude of the optical axis direction component of the optical element in the vector of the shock is equal to or less than a first threshold value which is smaller than the predetermined threshold value.

3. The image pickup apparatus according to claim 2, wherein
   the control unit determines, when the magnitude of the optical axis direction component of the optical element in the vector of the shock is larger than the first threshold value, that a step-out has occurred, and returns the optical element to the initial position.

4. The image pickup apparatus according to claim 1, wherein
   the optical element includes a zoom lens and a focus lens,
   the predetermined threshold value varies according to a position in an optical axis direction of the zoom lens, and
   the control unit returns the optical element to the initial position by moving a position of the focus lens.

5. The image pickup apparatus according to claim 4, wherein the control unit resets the cumulative shock to zero when changing the position in the optical axis direction of the zoom lens or when returning the optical element to the initial position.

6. The image pickup apparatus according to claim 4, wherein the position in the optical axis direction of the zoom lens is a position estimated based on a relational table, the relational table in which the vector of the shock and an estimated position of the zoom lens associated with each other.

7. An image pickup method comprising:
   detecting a shock applied to a body of an apparatus;
   adding up a vector of the shock in an optical axis direction of an optical element included in the apparatus, the adding up being performed each time the shock is detected; and
   when a cumulative shock exceeds a predetermined threshold value, the cumulative shock being a result of the adding up, determining that the optical element has stepped out and returning the optical element to a predetermined initial position.

* * * * *